(12) United States Patent
Curti et al.

(10) Patent No.: US 9,992,403 B2
(45) Date of Patent: Jun. 5, 2018

(54) METHOD AND SYSTEM FOR AUTOFOCUS, CORRESPONDING DEVICE AND COMPUTER PROGRAM PRODUCT

(71) Applicant: STMicroelectronics S.r.l., Agrate Brianza (IT)

(72) Inventors: Salvatore Curti, Catania (IT); Arcangelo Ranieri Bruna, Giardini Naxos (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 99 days.

(21) Appl. No.: 14/319,858

(22) Filed: Jun. 30, 2014

(65) Prior Publication Data

US 2015/0002703 A1 Jan. 1, 2015

(30) Foreign Application Priority Data

Jun. 28, 2013 (IT) .............................. TO2013A0534

(51) Int. Cl.
*G03B 13/00* (2006.01)
*H04N 5/232* (2006.01)
*G02B 13/00* (2006.01)

(52) U.S. Cl.
CPC ....... *H04N 5/23212* (2013.01); *G02B 13/009* (2013.01); *H04N 5/23296* (2013.01)

(58) Field of Classification Search
CPC .......... H04N 5/23212; H04N 5/23296; G02B 13/009

(Continued)

(56) References Cited

U.S. PATENT DOCUMENTS

| 7,747,158 B2* | 6/2010 | Ueda ...................... G03B 13/36 348/345 |
| 2001/0012074 A1* | 8/2001 | Ohkawara .......... H04N 5/23212 348/240.3 |

(Continued)

FOREIGN PATENT DOCUMENTS

EP 2270571 1/2011

OTHER PUBLICATIONS

Search Report for Italian patent application No. TO20130534; Berlin, Germany, dated Apr. 14, 2014; 2 pages.

(Continued)

*Primary Examiner* — Sinh Tran
*Assistant Examiner* — Zhenzhen Wu
(74) *Attorney, Agent, or Firm* — Seed IP Law Group LLP (57) ABSTRACT

In an embodiment, focusing an image-capture device such as, e.g., a camera including an optical system displaceable in opposite directions (A, B) via a focusing actuator, is controlled by evaluating a scale factor for the images acquired by the device. An accumulated value of the variations of the scale factor over a time interval (e.g., over a number of frames) is produced and the absolute value thereof is compared against a threshold. If the threshold is reached, which may be indicative of a zoom movement resulting in image de-focusing, a refocusing action is activated by displacing the optical system via the focusing actuator in the one or the other of the opposite focusing directions (A or B) as a function of whether the accumulated value exhibits an increase or a decrease (i.e., whether the accumulated value is positive or negative).

18 Claims, 4 Drawing Sheets

(58) Field of Classification Search
USPC ..... 348/345, 347, 351, 353; 396/89, 123, 80
See application file for complete search history.

(56) References Cited

U.S. PATENT DOCUMENTS

| | | | | |
|---|---|---|---|---|
| 2007/0030381 | A1* | 2/2007 | Maeda | G03B 13/36 348/345 |
| 2009/0009651 | A1* | 1/2009 | Takayanagi | G03B 13/36 348/345 |
| 2009/0148146 | A1 | 6/2009 | Maeda | |
| 2009/0160999 | A1* | 6/2009 | Nishimura | G02B 7/36 348/345 |
| 2010/0201864 | A1* | 8/2010 | Takayama | H04N 5/23212 348/349 |
| 2012/0314123 | A1* | 12/2012 | Lee | H04N 5/23222 348/362 |
| 2013/0308931 | A1* | 11/2013 | Ohara | G02B 7/102 396/81 |

OTHER PUBLICATIONS

Ahn et al., "A Fast Continuous Auto Focus Algorithm using the State Transition Model," *Pacific Science Review* 13(3):125-130, 2011.

Choi et al., "New Autofocusing Technique Using the Frequency Selective Weighted Median Filter for Video Cameras," International Conference on Consumer Electronics (ICCE), Jun. 22-24, 1999, Los Angeles, CA, pp. 160-161.

He et al., "Modified Fast Climbing Search Auto-focus Algorithm with Adaptive Step Size Searching Technique for Digital Camera," *IEEE Transactions on Consumer Electronics* 49(2):257-262, May 2003.

Kim et al., "A Video Camera System with Enhanced Zoom Tracking and Auto White Balance," *IEEE Transactions on Consumer Electronics* 48(3):428-434, Aug. 2002.

Lee et al., "An Advanced Video Camera System With Robust AF, AE, and AWB Control," *IEEE Transactions on Consumer Electronics* 47(3):694-699, Aug. 2001.

* cited by examiner

METHOD AND SYSTEM FOR AUTOFOCUS, CORRESPONDING DEVICE AND COMPUTER PROGRAM PRODUCT

PRIORITY CLAIM

The instant application claims priority to Italian Patent Application No. TO2013A000534, filed 28 Jun. 2013, which application is incorporated herein by reference in its entirety.

TECHNICAL FIELD

The disclosure relates to autofocus techniques.

One or more embodiments may apply to continuous autofocus arrangements adapted to reduce the time range of the re-focusing process in case a zoom-in or zoom-out movement is detected.

SUMMARY

As an alternative to dedicated sensors, as may be used, e.g., in high-level still cameras, certain implementations of image-capture devices such as, e.g., webcams, security cameras, and mobile sensors, may use the very information provided by the capture device for focusing purposes.

Various computer-vision implementations may thus aim at retrieving, in a short time range, an in-focus image if an image becomes blurred during live image acquisition of a general scene.

For instance, in certain implementations, statistics from the images captured by the capture device may be used to detect whether focusing has been achieved. High-frequency components may be used as a "focus measure" (FM). In certain implementations, a lens adjustment position where FM has a maximum may correspond to the target position of the auto-focus (AF) feature.

Certain implementations may use a so-called "hill climbing search" (HCS) where:
 a FM value is evaluated for the current lens position and the lens moves according to a fixed lens direction (or sense),
 a new FM value is evaluated and compared with the FM value for the previous lens position,
 if the FM is found to decrease, the lens is moved in the opposite direction to search for an in-focus position.

In order to reduce, or even to minimize, the re-focus time range, when a new search starts, a correct lens direction and a related step dimension may be evaluated in order to drive the actuator of the re-focusing mechanism.

Certain implementations may use feature-based extraction methods in order to achieve and improve the re-focusing action.

Also, certain implementations recognize that during scene acquisition, the aim of a continuous auto-focus process may be to keep the image in-focus while searching the correct lens position; when a scene change occurs, due to movement of the camera or the objects being captured, a continuous autofocus process may restart the search in order to re-focus the image of a current acquired scene.

When performing re-focus, certain implementations of autofocus may thus restart a search by using the current lens direction or the opposite lens direction at the closest end of the lens-position adjustment run. In this manner, if the evaluated focus measure FM decreases with respect to the previous value, then the lens direction may be changed to the opposite value before the refocus process is continued. This may result in an increase of the time range for identifying the correct lens position in order to re-focus the image of the acquired scene.

Exemplary of such an implementation is, e.g., Choi, J. Lee, and S. Ko, "New autofocusing technique using the frequency selective weighted median filter for video cameras", IEEE Trans. On Consumer Electronics, Vol. 45, No. 3, Aug. 1999, pp. 820-827, which is incorporated by reference.

Other implementations such as, e.g., J. Lee, Y. Jung, B. Kim, and S. Ko, "An advanced video camera system with robust AF, AE, and AWB control," IEEE Trans. on Consumer Electronics, Vol. 47, No. 3, Aug. 2001, pp. 694-699, which is incorporated by reference, may use the luminance curve value in the case of a high light intensity in the scene in order to set the lens direction.

Other implementations aiming at improving the correct lens-direction identification for re-focusing an image are disclosed, e.g., in:
 Yoon Kim, June-Sok Lee, Morales, A. W, "A video camera system with enhanced zoom tracking and auto white balance", IEEE Trans. on Consumer Electronics, Vol. 48, No. 3, August 2002;
 Jung-Ho Ahn, Jaepil Ko, Il-Young Lee and Seung-Hyun Kim, "A Fast Continuous Auto Focus Algorithm using the State Transition Model", Pacific Science Review, Vol. 13, No. 3, 2011, pp. 125-130; and
 Jie He, Rongzhen Zhou and Zhiliang Hong, "Modified Fast Climbing Search Auto-focus Algorithm with Adaptive Step Size Searching Technique for Digital Camera", IEEE Trans. on Consumer Electronics, Vol. 49, No. 2, May 2003, pp. 257-262, which is incorporated by reference.

An embodiment overcomes the drawbacks of the implementations discussed in the foregoing.

One or more embodiments may refer to a corresponding system, a corresponding apparatus (e.g., a camera) including such as system, as well as to a computer-program product loadable in the memory of at least one computer and including software-code portions for executing the steps of a method when the product is run on at least one computer. As used herein, reference to such a computer-program product is understood as being equivalent to reference to a computer-readable means containing instructions for controlling the processing system in order to co-ordinate implementation of a method according to an embodiment. Reference to "at least one computer" is intended to highlight the possibility of and embodiment being implemented in modular or distributed form.

One or more embodiments may lead to a reduction of the time range involved in re-focusing an acquired image.

One or more embodiments may permit identifying a correct lens direction and related step dimension when a zoom-in or zoom-out movement is detected.

One or more embodiments may be based on a feature-based evaluation of a scale factor, making it possible to retrieve a correct motion direction and the related steps of the camera lens.

One or more embodiments may make it possible to identify, during scene acquisition, the correct search direction of the lens and the related steps, e.g., when a scene change occurred, thus improving the speed in finding a correct in-focus frame.

One or more embodiments may provide one or more of the following advantages:
 for still AF: detection of moving objects (e.g., to move the focus position) is improved or a focus-position search is made faster, for continuous AF: detection of moving objects is improved or estimation of motion direction is made faster and more reliable, with the possibility of estimating a new focus position.

BRIEF DESCRIPTION OF THE DRAWINGS

One or more embodiments will now be described, purely by way of non-limiting example, with reference to the annexed drawings.

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured. Reference to "one or more embodiments" in the framework of the present description is intended to indicate that a particular configuration, structure, or characteristic described in relation to an embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for the convenience of the reader and hence do not define the scope of protection or the scope of the embodiments.

Figure 1:
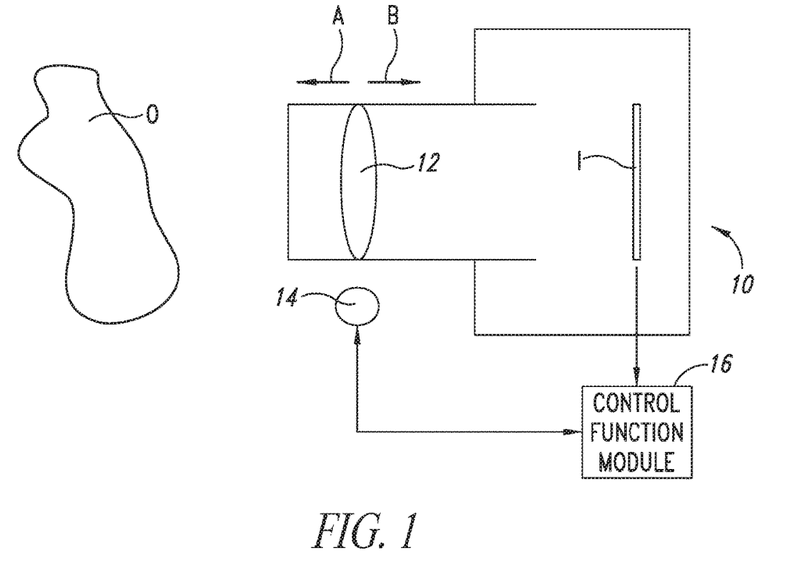
FIG. 1 is a schematic representation of an image-capture device to which embodiments may apply.

FIG. 1 is a schematic representation of an image-capture device 10 to which embodiments may apply. In one or more embodiments, the device 10 may be a camera of any known type having an optical system (briefly, a "lens") 12 and an autofocus (AF) feature including, e.g., a lens actuator 14 driven by a control-function module 16, which is sensitive to the images (frames) I captured by the lens 12 and drives the actuator 14 with the aim of causing the images captured by the camera 10 to be properly focused.

Focusing is achieved by the actuator 14 moving (e.g., sliding) the lens 12 in either direction, e.g., forward towards an object O being framed (see arrow A) or backward away from the object O (see arrow B).

Such systems, and the general principles underlying operation of these systems, are well known in the art, which makes it unnecessary to provide a more detailed description herein.

One or more embodiments may relate to processing performed in the control-function module 16 in order to drive the actuator 14 based on the images (e.g., frames) captured by the camera 10.

Figure 2:
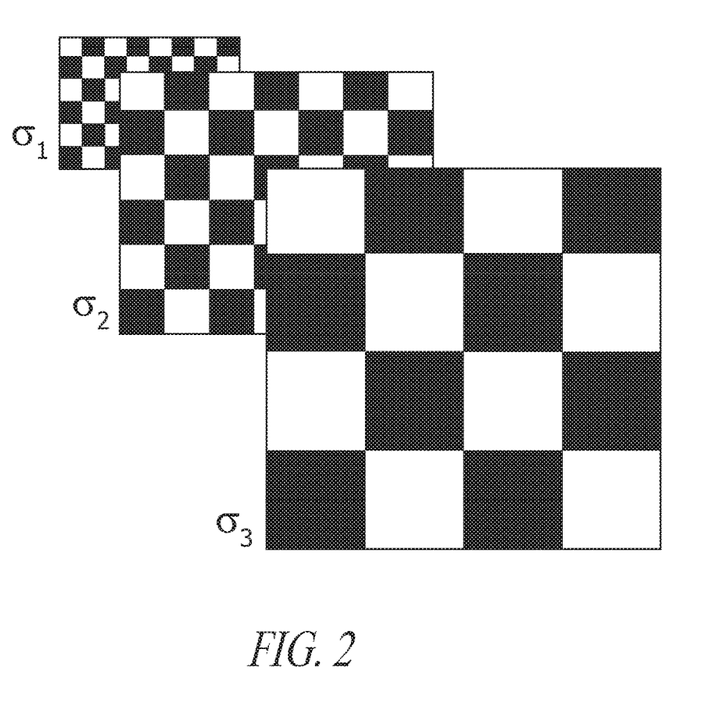
FIG. 2 is a schematic representation of certain principles underlying embodiments.

FIG. 2 is schematically representative of the fact that zoom-in or zoom-out motion (that is, relative motion, e.g., motion of the camera 10 with respect to an object whose image is being captured or motion of the object with respect to the camera 10) leading to image de-focusing may correspond to a variation in a scale factor σ of the image, e.g., $\sigma_1 < \sigma_2 < \sigma_3$ (these values being referred to a given reference frame).

A scale factor may be defined as a number used to multiply the dimensions of a figure to stretch or shrink it to a similar image (i.e., a reference frame).

For instance, if all the dimensions in an image are twice as long as the corresponding dimensions in the original, the image may be said to have a scale factor of 2. Stated otherwise, a scale factor may be defined as the ratio of an image side length to the corresponding original side length.

The possibility also exists of defining a scale factor as the reciprocal of that ratio, so that the exemplary case of FIG. 2 may likewise be represented as one case where $\sigma_1 < \sigma_2 < \sigma_3$.

Whatever the definition, the schematic representation of FIG. 2 highlights the fact that relative movement of the capture device (e.g., a camera) and the object whose image is being captured may cause the image to become both blurred (i.e., de-focused) and smaller or larger (i.e., with a change in the scale factor, that is with $\sigma_1 \neq \sigma_2 \neq \sigma_3$).

In one or more embodiments, the scale factor, however determined, may be useful to obtain a reliable estimation of the direction (and possibly the entity) of motion. One or more embodiments may recognize that the motion of the objects may correspond to a scale factor variation so that computing a scale factor may be useful in order to obtain a reliable estimation of the lens direction and related step entity.

During image acquisition and for each frame, an image I acquired by the camera 10 may be processed to evaluate the value of a scale factor σ at the current (relative e.g., object-to-camera) position at a time t, e.g., σ(t) and referred to the previous frame.

Figure 3:
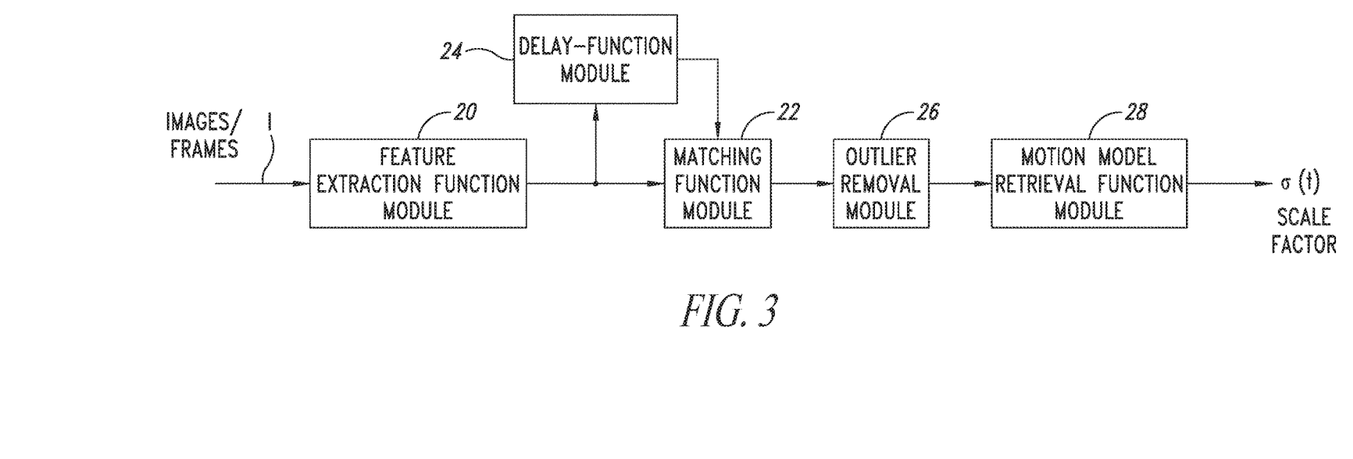
FIG. 3 is a schematic representation of embodiments.

FIG. 3 is an exemplary block diagram representation of one possible way of implementing the related processing in the control-function module 16. The representation of FIG. 3 is largely exemplary; similar results may be obtained by adopting a wide variety of different techniques.

In the exemplary representation of FIG. 3, the input images I (or frames, subsequent images, the two designations, images and frames, being used herein synonymously) are fed to a feature-extraction-function module 20.

The feature points thus extracted are fed to a matching-function module 22 which, in cooperation with a delay-function module 24, produces an optical flow which is fed to an outlier-removal-function module 26 to produce a new optical flow with outliers removed. Such a new optical flow is fed to a motion-model-retrieval-function module 28, which produces a scale factor σ(t).

The approach exemplified in FIG. 3 may include an outlier-removal action (outlier-removal-function module 26) in order to take into account the fact that the object O whose image is captured may not be isolated in the scene (as schematically represented in FIG. 1), but rather may appear against background scenery.

The approach exemplified in FIG. 3 is just one possible way of implementing the processing leading to producing a scale factor σ(t) and alternative ways are known to those of skilled in the art from the related literature. Also, one or more embodiments may be concerned with processing a scale factor associated with an image (frame) in connection with possible changes in such a factor, irrespective of the specific criteria adopted for defining or determining the scale factor.

Whatever the approach adopted for defining or determining the scale factor, a function linking the value of a scale factor σ(t) to a current lens position may be used to retrieve the "correct" new lens position LP(t) to be obtained by means of the actuator 14 as:

$$LP(t)=f(\sigma(t),\text{prev\_LP},\text{prev\_}\sigma)$$

where prev_LP and prev_σ denote the previous values of the lens position LP and a scale factor σ(t−1).

The output of such processing, i.e., LP(t), may be regarded as indicative of the number (and the direction, see, e.g., A or B in FIG. 1) of the adjustment steps to be imparted by the actuator 14 to the lens 12 in order to perform, starting from the current position and the value for LP(t), a re-focusing action which aims at compensating image de-focusing resulting from a zoom motion, e.g., relative motion of the camera 10 with respect to an object whose image is being captured or motion of the object with respect to the camera 10.

In one or more embodiments, if an acquired frame is "signed" as in-focus, a scale factor variation with respect thereto may be accumulated frame by frame, that is image by image:

$$\Sigma\Delta(t)=\Sigma(1-\sigma(t))$$

where σ(t)=1 may represent a situation where no scale factor variation has occurred between a previous frame and the current frame, so that Δ(t)=1−σ(t) may represent a scale-factor variation between these two frames.

In one or more embodiments, an accumulated delta scale factor, that is the accumulated value of the scale factor variations over a certain time interval (e.g., over a certain number of frames) may be used to identify if a zoom-in or zoom-out object movement occurs, e.g.:

If ΣΔ(t) increases→Zoom-in
If ΣΔ(t) decreases→Zoom-out
(or vice-versa, depending on how the scale factor is defined).

Figure 4:
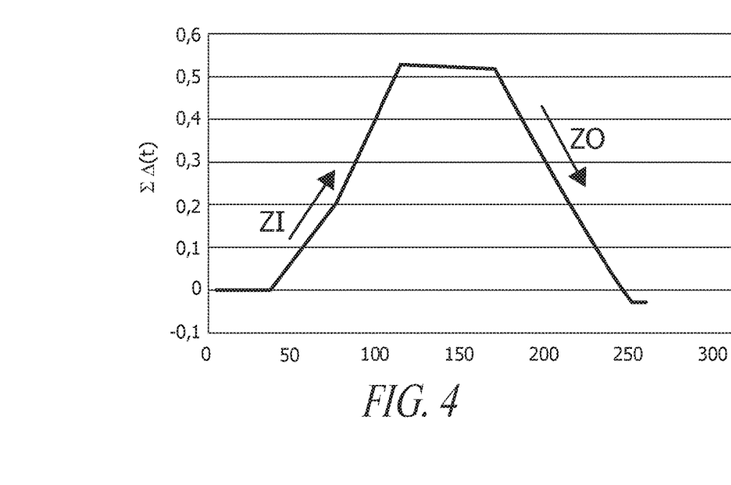
FIG. 4 is a diagram exemplary of zoom-in and zoom-out movements in embodiments.

This effect is schematically represented in the diagram of FIG. 4, where a possible behavior of a cumulated delta scale factor ΣΔ(t) is portrayed (ordinate scale) as a function of the number of frames (abscissa scale) over which ΣΔ(t) is cumulated over time (frame 0 is assumed to be representative of a notionally in-focus image). FIG. 4 thus shows that the cumulated value ΣΔ(t) follows the zoom direction.

For instance, the diagram of FIG. 4 portrays an increase of ΣΔ(t) approximately over frames 40 to 100 (which may be held to be representative of a zoom-in movement ZI) and a decrease of ΣΔ(t) approximately over frames 160 to 250 (which may be held to be representative of a zoom-out movement ZO). The situation over approximately frames 100 to 160 is indicative of the substantial absence of any zoom movement (e.g., under-threshold movement).

Figure 5:
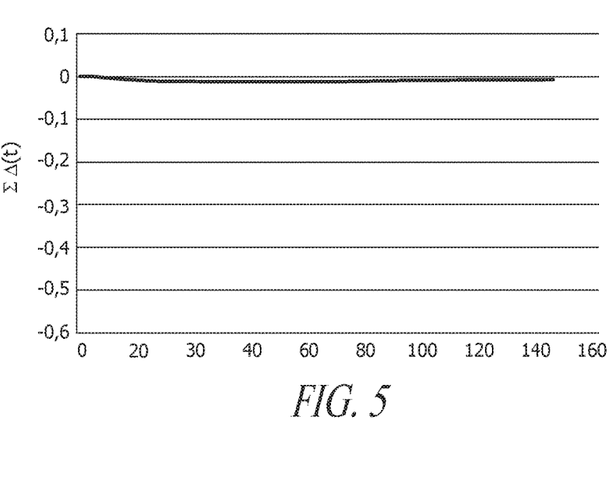
FIG. 5 is a comparative diagram.

By way of reference, the diagram of FIG. 5 shows in direct comparison to the diagram of FIG. 4 how the cumulated value ΣΔ(t) may remain substantially constant over time, e.g., over the frames in the abscissa scale, in the case of a panning processing as used, e.g., in distinguishing between desired and undesired movement in image acquisition.

In one or more embodiments, if a zoom-in or zoom-out object movement is detected (with respect to an image/frame notionally assumed to be correctly focused), the acquired frame may be "signed" as blurred and before starting a new autofocus search (e.g., using a hill climbing search or HCS approach as described previously) an initial lens direction (sense—e.g., move the lens 12 forward or backward: see the arrows A and B in FIG. 1) and a related step value to drive the lens actuator 14 are evaluated.

In one or more embodiments, the initial lens direction may depend on the kind of object movement (zoom-in, zoom-out), while the value of the lens step depends on the evaluated scale factor.

In one or more embodiments, a threshold value TH may be adopted, and the absolute value (modulus) of the cumulated scale factor variations, e.g., |ΣΔ(t)| may be compared with that threshold to detect a zoom movement, e.g., if |ΣΔ(t)|>TH→a zoom object movement is detected.

In one or more embodiments, there are two threshold values TH1 and TH2 for a lens movement in the MACRO direction and a lens movement in the INFINITY direction, respectively.

In one or more embodiments, ΣΔ(t) may thus be reset to zero whenever a new "in-focus" position is reached.

In one or more embodiments, the sign, i.e., whether ΣΔ(t) is representative of an increase or decrease may be checked, and then, e.g.:

a) if ΣΔ(t)>0→start lens movement in a first direction (direction A (INFINITY) in FIG. 1)

b) if ΣΔ(t)<0→start lens movement in a second, i.e., opposite, direction (direction B (MACRO) in FIG. 1).

The above represents an exemplary embodiment of the principle of activating a refocusing action by displacing the lens 12 via the actuator 14 in the one or the other of the opposite directions (A or B) as a function of whether the cumulated value ΣΔ(t) exhibits an increase or a decrease over a certain time interval (e.g., over a certain number of frames). It is appreciated that whether ΣΔ(t)>0 may result in the re-focusing direction being A and whether ΣΔ(t)<0 in the re-focusing direction being B (or vice-versa, e.g., ΣΔ(t)>0→B and ΣΔ(t)<0→A) will ultimately depend on how a scale factor σ(t) or ΣΔ(t) are defined for a specific embodiment.

In one or more embodiments, the starting step of the lens movement may be first selected as Start Lens Step= f(t)*|ΣΔ(t)|, where f(t) depends on the lens characteristics, and then adapted as a function of |ΣΔ(t)|.

Figure 6:
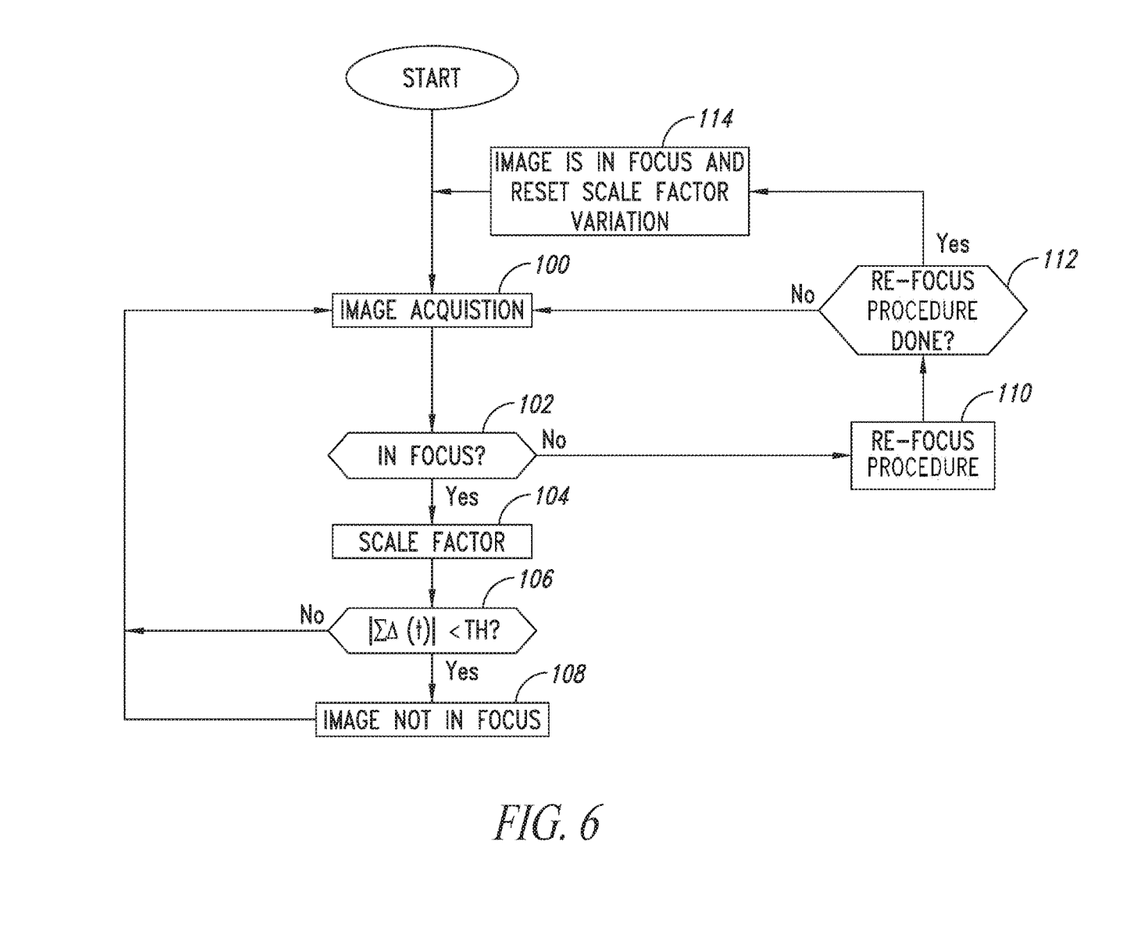
FIG. 6 is an exemplary flowchart of an implementation of embodiments.

The flow chart of FIG. 6 is exemplary of one or more embodiments of an auto-focus procedure adapted to be implemented in an image-capture device 10 (e.g., in the processing-function module 16) as represented in FIG. 1.

The blocks 100 to 114 in FIG. 6 are exemplary of the following steps or functions:

image acquisition (block 100);
check if image is in focus (block 102);
if the check in block 102 yields "true" (e.g., ImageIsInFocus=True), a scale factor σ(t) is evaluated—in any known manner, e.g., as exemplified in FIG. 3 (block 104);
the absolute-value |ΣΔ(t)| is compared with the threshold TH (block 106); if lower than the threshold (e.g., no), return to image acquisition (block 100);
if the absolute value |ΣΔ(t)| is higher than the threshold TH (e.g., yes), then the lens direction and step are initialized (started) and the image is identified as not being in focus, e.g., ImageIsInFocus=False (block 108), return to image acquisition (block 100);
if the check in block 102 yields "false" (e.g., ImageIsInFocus=False), a (re)focus procedure is performed, e.g., HCS (block 110);

check if the (re)focus procedure has stopped (block 112) and, if not stopped, return to image acquisition (block 100);

if the (re)focus procedure has stopped, re-set ImageIsInFocus=True and set ΣΔ(t) to zero (block 114) and return to image acquisition (block 100).

Experimental results have confirmed that, in one or more embodiments, the accumulated delta scale factor, that is the cumulated value of the scale factor variations over a certain time interval (e.g., over a certain number of frames) may be used in order to discriminate between Zoom-out and Zoom-in conditions.

Starting from this analysis, in one or more embodiments, such an accumulated value may be used to identify if a new auto focus (AF) search is to be re-started and retrieve the correct motion direction of the lens when the AF re-starts the search.

One or more embodiments may take into account the fact that the value of the new lens position obtained as discussed in the foregoing may refer to current values for the scale factor σ and the current lens to-object-distance. In the next frame, while the lens may be in the position previously evaluated, the lens-to-object distance may be different, e.g., due to an intervening object movement (that is an intervening zoom movement) so that the object image may be blurred.

One or more embodiments may thus use a predictive filter (e.g., included in the motion-model-retrieval-function module 28) in order to evaluate the value of the lens position using a state variable x(t). In that case, the previous relationship LP(t)=f(σ(t), prev_LP, prev_σ) where prev_LP and prev_σ denote the previous values of the lens position LP and a scale factor σ, may take the form:

$$LP(t)=f(\sigma_p(t), prev\_LP, prev\_\sigma_p)$$

With $$\sigma_p(t)=f(x(t))$$

$$x(t)=f(x(t-1), \sigma(t))$$

A Kalman filter is exemplary of a predictive filter which may be used in one or more embodiments.

In one or more embodiments, starting from a predicted scale factor value, a "Delta Predicted Scale Factor" may be first evaluated as:

$$\Delta\sigma_p(t)=1-\sigma_p(t)$$

An "Accumulated Delta Scale Factor" may then be retrieved (e.g., at frame level) as:

$$\lambda(t)=\Sigma\Delta\sigma_p(t)$$

so that if λ(t)≠0 a zoom movement may be detected.

Starting from the current lens position and the lens characteristic, the value of the magnification M(t) and related range variation inside the depth of field $\Delta M_{Max}(t)$ can be evaluated.

One or more embodiments may use $\Delta M_{Max}(t)$ as a threshold for determining if an object is within the depth of field.

In one or more embodiments, if $|\lambda(t)|>\Delta M_{Max}(t)$, the frame is blurred and the lens direction and related step to drive the lens can be obtained, e.g., as follows:

if λ(t)>0→Lens Direction toward the MACRO position;
if λ(t)<0→Lens Direction toward the INFINITY position.

In one or more embodiments, the lens step may be calculated, e.g., as:

$$Step(t)=f(\lambda(t), \Delta M_{Max}(t)).$$

One or more embodiments may offer the advantage that the lens step may provide directly the in-focus position with no need of activating other search methods (e.g., Hill Climbing Search—HCS), which may turn out to be slower.

In fact, in case of a zoom-in or zoom-out motion being detected, in one or more embodiments adopting a predictive filtering, the value of the scale factor may be used to directly evaluate the new position of the lens, i.e., the one where the object of interest will be expectedly in focus.

Operation of one or more such embodiments is exemplified in the flowchart of FIG. 7, where the processing steps indicated are as follows:

image acquisition 200;
image feature evaluation 202;
zoom movement detection 204; if no motion is detected, e.g., false, return to image acquisition 200;
check if object is inside the depth of field 206;
if 206 yields "yes" (i.e., object is still inside the depth of field) the scale-factor variation is accumulated at 208 with return to image acquisition 200;
if 206 yields "no" (i.e., object is outside the depth of field) lens direction (MACRO/INFINITY) and step are determined and the accumulated scale-factor variation is reset in view of a new threshold evaluation with return to image acquisition 200.

Figure 7:
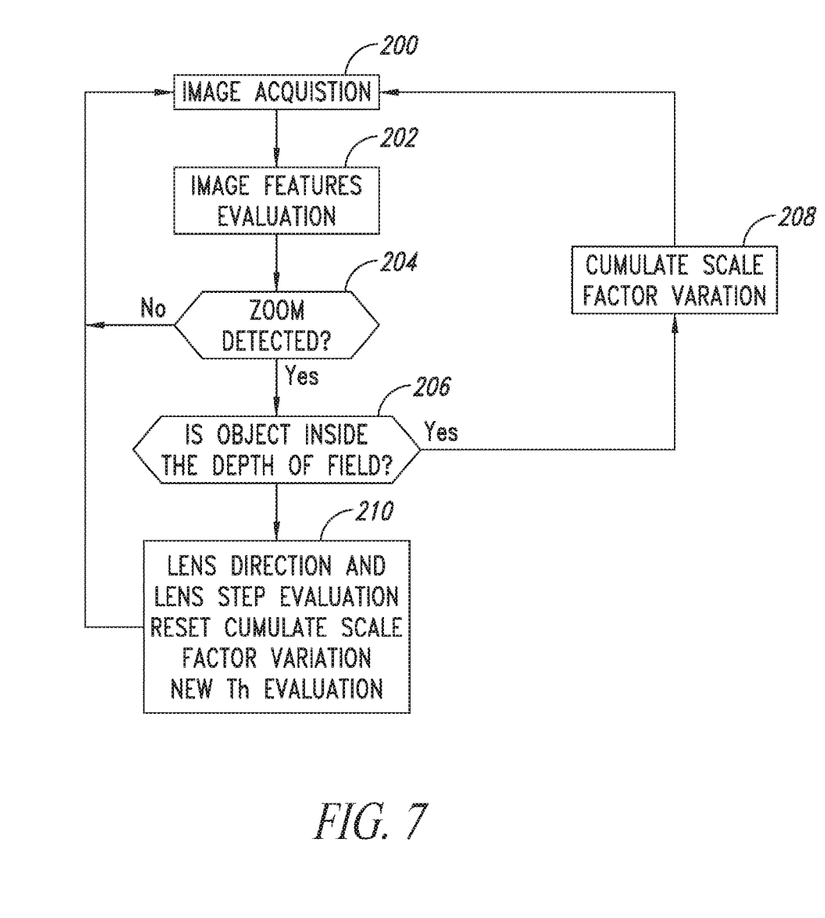
FIG. 7 is an exemplary flowchart of another implementation of embodiments.

In one or more embodiments as exemplified in FIG. 7, after a first transition, e.g., camera turn on and search of the focus position of the object, the variation of the "scale factor" may be computed as discussed previously.

The characteristics of the optical lens may then be used to compare the variation of the scale factor between two subsequent frames (possibly accumulated with the one obtained for the previous frames) by computing the variation of the magnification ratio between the current position of the lens and the limit positions of the "depth of field". This makes it possible to determine if, due to the zoom movement (as detected in step 204), the object has exited the "depth of field" area (which is checked in step 206).

If the object is still within the "depth of field" area (check of step 206 yields "yes"), then the variation of the scale factor is accumulated with the previous value.

If the object is no longer within the "depth of field" area (check of step 206 yields "no"), then the new position of the lens (direction/step) is evaluated.

Once a new image is acquired in such a new position, the sequence is repeated.

In one or more embodiments, if no (appreciable) variation of the scale factor is detected, the possibility may exist of achieving a higher accuracy by resorting, e.g., to a Hill Climbing Search or HCS procedure by using small steps in order to refine the focus position.

It will be appreciated that in one or more embodiments as exemplified in FIG. 6, a fixed threshold value TH, or two fixed threshold values TH1 and TH2, are used in step 106 in order to determine if a new in-focus position is to be searched, e.g., by using a HCS procedure in step 110.

It will be similarly appreciated that, in one or more embodiments as exemplified in FIG. 7, a variable threshold is used in the place of a fixed threshold TH. In one or more embodiments, such a variable threshold may be a function of the position of the lens related, e.g., to the depth of field. In one or more embodiments, such a variable threshold may direct displacement of the lens to a position evaluated thereby. For example, for a given focus position of a lens or lens assembly, a first threshold value TH1 depends on the focus position and a limit (edge) of the depth of field (DOF) in the MACRO direction, and a second threshold value TH2 depends on the focus position and a limit of the DOF in the INFINITY direction, where, of course, the DOF can be defined for a particular system or application. Without prejudice to the underlying principles of the subject matter disclosed herein, the details and embodiments may vary, even significantly, with respect to what is illustrated herein purely by way of non-limiting example, without thereby departing from the extent of protection.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A system, comprising:
   an image capture device configured to capture images including an object of interest;
   an optical system displaceable in first and second opposite directions to focus the object of interest in the images captured by the image capture device;
   an optical system actuator configured to displace the optical system in the first and second directions; and
   a control-function module coupled to the optical system and the optical system actuator, the control-function module configured to calculate a scale factor of captured images, determine an accumulated value of variations of the scale factor over a time interval, compare the accumulated value to a threshold, determine a direction of the displacement of the optical system based on variations in the accumulated value over the time interval, and, in response to the accumulated value reaching the threshold, the control-function module configured to determine a new position for the optical system based on a predicted scale factor generated through predictive filtering, and the control-function module further configured to control the optical system actuator to displace the optical system based on the determined direction and new position to focus images captured by the image capture device.

2. The system of claim 1 wherein the optical system includes a lens assembly and wherein the control-function module includes a Kalman filter configured to perform the predictive filtering.

3. A method of controlling focus in an image capture device, the method comprising:
   evaluating a scale factor for images acquired by the image capture device, the image capture device including an optical system that is displaceable in opposite directions via a focusing actuator;
   producing a cumulated value of the variations of said scale factor over a time interval;
   comparing the absolute value of said cumulated value against a threshold;
   if said absolute value reaches said threshold, thus being indicative of a zoom movement resulting in image de-focusing, activating a refocusing action by displacing said optical system via said focusing actuator in the one or the other of said opposite directions as a function of whether said cumulated value exhibits an increase or a decrease over said time interval; and
   displacing said optical system via said focusing actuator by steps, the amount of said steps being a function of a depth of field and an accumulated delta scale factor based on a summation of variations over time of a predicted scale factor generated through predictive filtering.

4. The method of claim 3, wherein the amount of each of said steps is given by:

$$\text{Step}(t)=F(\lambda(t),\Delta M_{Max}(t))$$

wherein $\Delta M_{Max}$ is a range variation inside a depth of field and $\lambda(t)$ is an accumulated delta predicated scale factor given by $(\lambda(t)=\Sigma\Delta\sigma_P(t))$ where $\sigma_P(t)$ is the predicted scale factor and $\Delta\sigma_P(t)=(1-\sigma_P(t))$.

5. The method of claim 3, wherein said refocusing action includes a hill climbing search procedure.

6. The method of claim 5 further comprising:
   acquiring images by said image capture device as subsequent frames relative to an initial acquired frame captured by said image capture device; and
   wherein producing a cumulated value of the variations of said scale factor over a time interval comprises producing the cumulated value of the variations of said scale factor over a number of the subsequent frames.

7. The method of claim 3, wherein evaluating a scale factor for images acquired by the image capture device comprises feature-based extraction on the images acquired by the image capture device.

8. The method of claim 3, wherein said displacing said optical system via said focusing actuator includes evaluating the position of said optical system by using predictive filtering.

9. The method of claim 8, wherein evaluating the position of said optical system by using predictive filtering comprises Kalman filtering.

10. A method of controlling an image capture device, comprising:
    calculating a scale factor of images captured by the image capture device;
    providing an accumulated value of variations of the scale factor over a time interval;
    comparing the accumulated value to a threshold;
    generating a predictive value of the scale factor based upon predictive filtering;
    displacing an optical system of the image capture device to refocus images captured by the image capture device, the displacing being based upon the accumulated value reaching the threshold and the predictive value of the scale factor; and
    determining a direction of the displacement of the optical system based on variations in the accumulated value over the time interval.

11. The method of claim 10, wherein comparing the accumulated value to a threshold comprises comparing an absolute value of the accumulated value to the threshold, the absolute value reaching the threshold being indicative of a zoom movement of the optical system that results de-focusing of images captured by the image capture device.

12. The method of claim 11, wherein displacing the optical system of the image capture device to refocus images captured by the image capture device comprises activating a focusing actuator of the optical system to displace the optical system in a first direction towards an object being imaged or in a second direction away from the object being imaged based upon variations in the absolute value over the interval.

13. The method of claim 10, wherein determining the new position of the optical system based upon predictive filtering comprises calculating a new position of the optical system based upon the scale factor.

14. The method of claim 10 further comprising:
detecting a zoom-in and zoom-out condition of the optical system based on the accumulated value; and
resetting the accumulated value upon detecting a zoom-in or zoom-out condition.

15. A method of controlling an image capture device, comprising:
evaluating image features of images captured by the image capture device, the image features including a scale factor;
detecting zoom-in and zoom-out motion of an object of interest in captured images based on the evaluated image features;
detecting whether an object of interest in the captured images is within a depth of field;
calculating an accumulated value of variations of the scale factor over a time interval when the object of interest is within the depth of field;
predicting a value of the scale factor based upon predictive filtering;
resetting to an initial value the accumulated value of variations of the scale factor and determining a direction and step for positioning an optical system of the image capture device based on the predicted value of the scale factor in response to the object of interest not being within the depth of field.

16. The method of claim 15, wherein determining a direction and step for positioning an optical system of the image capture device comprises displacing a lens of the optical system to a new position based upon the direction and step.

17. The method of claim 15 wherein detecting zoom-in and zoom-out motion of an object of interest in captured images based on the evaluated image features comprises detecting an increase in the accumulated value to detect a zoom-in motion and detecting a decrease in the accumulate value to detect a zoom-out motion.

18. The method of claim 16 further comprising displacing the lens through a focus position search procedure using smaller steps to refine the position of the lens.

* * * * *